(12) United States Patent
Chen et al.

(10) Patent No.: US 8,266,834 B2
(45) Date of Patent: Sep. 18, 2012

(54) DISPLAY FRAME AND SUPPORT UNIT THEREOF

(75) Inventors: Chun-Lung Chen, Zhonghe (TW);
Kuei-Lai Huang, Zhonghe (TW);
Chung-Wei Hsu, Zhonghe (TW);
Kai-Teng Cheng, Taipei (TW)

(73) Assignees: Syncmold Enterprise Corp. (TW);
Acer Incorporated (TW)

( * ) Notice: Subject to any disclaimer, the term of this patent is extended or adjusted under 35 U.S.C. 154(b) by 220 days.

(21) Appl. No.: 12/852,823

(22) Filed: Aug. 9, 2010

(65) Prior Publication Data

US 2011/0247252 A1    Oct. 13, 2011

(30) Foreign Application Priority Data

Apr. 7, 2010   (TW) ................................. 99206091 U

(51) Int. Cl.
*E04G 3/00* (2006.01)

(52) U.S. Cl. ....... 40/749; 248/372.1; 248/688; 248/371; 235/383

(58) Field of Classification Search ............ 40/747–750; 248/176.3, 284.1, 292.13, 919, 292.11, 323, 248/324, 325, 351, 371–372.1
See application file for complete search history.

(56) References Cited

U.S. PATENT DOCUMENTS

| | | | |
|---|---|---|---|
| 6,609,272 B1 * | 8/2003 | Lee | 16/307 |
| 6,899,311 B1 * | 5/2005 | Ternus | 248/454 |
| 7,111,361 B2 * | 9/2006 | Li et al. | 16/284 |
| 7,150,072 B2 * | 12/2006 | Huang et al. | 16/312 |
| 7,150,440 B2 | 12/2006 | Yuan | |
| 7,159,771 B2 * | 1/2007 | Singgih et al. | 235/383 |
| 7,320,451 B2 * | 1/2008 | Ogawa | 248/161 |
| 7,421,762 B2 * | 9/2008 | Lu et al. | 16/328 |
| 7,448,588 B2 * | 11/2008 | Sung | 248/351 |
| 7,467,773 B2 * | 12/2008 | Ogawa et al. | 248/472 |
| 7,478,788 B2 | 1/2009 | Hsu | |
| 7,640,628 B2 * | 1/2010 | Hu | 16/340 |
| 7,673,844 B2 * | 3/2010 | Zhang et al. | 248/372.1 |
| 7,735,797 B2 * | 6/2010 | Hu | 248/371 |
| 7,753,336 B2 * | 7/2010 | Hu | 248/688 |
| 7,887,019 B2 * | 2/2011 | Yeh et al. | 248/372.1 |
| 8,079,166 B2 * | 12/2011 | Li et al. | 40/748 |
| 8,118,274 B2 * | 2/2012 | McClure et al. | 248/688 |
| 8,146,869 B2 * | 4/2012 | Wang et al. | 248/125.2 |
| 2006/0237623 A1 * | 10/2006 | Sung | 248/688 |
| 2007/0235626 A1 * | 10/2007 | Mamizuka et al. | 248/677 |
| 2007/0254509 A1 * | 11/2007 | Fan et al. | 439/171 |
| 2010/0243850 A1 * | 9/2010 | Derry | 248/372.1 |
| 2011/0025176 A1 * | 2/2011 | McClure et al. | 312/223.2 |
| 2011/0062304 A1 * | 3/2011 | Hsieh et al. | 248/372.1 |
| 2012/0006950 A1 * | 1/2012 | Vandiver | 248/176.3 |

* cited by examiner

*Primary Examiner* — Lesley D Morris
*Assistant Examiner* — Shin Kim
(74) *Attorney, Agent, or Firm* — Cantor Colburn LLP

(57) ABSTRACT

The instant disclosure provides a photo-frame-type display and a support unit thereof. The display has a display frame unit having a bottom portion disposable on a working surface. The support unit comprises a connecting base unit fixedly disposed to the back of the display frame unit, an inclining module pivotally coupled to the connecting base unit, and a rebounding module on the back of the display frame unit in elastic connection with the inclining module. The photo-frame-type display may be disposed on a tabletop in a fashion resembling a traditional photo frame, and the support unit is capable of steadily sustaining the display frame unit in a steep inclining configuration suitable for touch-screen/handwriting operations.

19 Claims, 6 Drawing Sheets

DISPLAY FRAME AND SUPPORT UNIT THEREOF

BACKGROUND OF THE INVENTION

1. Field of the Invention

The present disclosure is related to a display frame and a support unit thereof, and more particularly to a support unit pivotally connected to the back of the display frame unit, wherein the bottom of the display frame unit is disposed on tabletop like a photo frame, and the support unit could be adjusted to securely support the display frame unit at different angles.

2. Description of Related Art

With the advancement in liquid crystal display technology, LCD has become widely accessible, and has been implemented in a wide range of applications, such as image display units for computers or televisions. Moreover, in recent years, LCD technology has even been upgraded to encompass touch-screen and handwriting recognition capabilities.

The LCD display with a conventional support unit is limited to a small inclining angle. For one thing, the conventional support unit often has difficulties reaching and maintaining a wide inclining angle suitable for touch-screen operations. Moreover, when the LCD is equipped with touch-screen/handwriting capabilities, a conventional support unit may not provide sufficient support to hold the LCD unit stationary; the swaying and shaking of the display from a user's touch not only may cause operational inaccuracy, but may also negatively affect the user's eyesight.

To prevent the LCD display from being swayed and shook during handwriting operations, U.S. Pat. No. 7,150,440 disclosed a supporting frame add-on to a conventional supporting stand of a LCD. The conventional supporting stand is disposed on a tabletop supporting the entire weight of the display unit, while the two ends of the add-on supporting frame respectively join the upper and the lower ends of the conventional display stand to limit the swaying motion of the LCD.

U.S. Pat. No. 7,478,788 by Hsu disclosed another supporting structure for a LCD to enable wide inclining angle adjustments. Hsu disclosed a supporting structure having two pairs of crossing legs coupled in a scissor-like manner that resemble the legs of a folding picnic table.

Unfortunately, the above-mentioned add-on structures lack integral structural unity when adapted to the display unit, thus negatively affect the appearance of the LCD as a whole. Moreover, they still offer limited and inconvenient angle adjustment for the LCD. One the other hand, the esthetic yet secure structure of a traditional photo frame has made it a widely popular decorative indoor ornament for generations.

Therefore, it is desirable to propose a photo-frame-type display and a support unit thereof that is capable of providing secured structural support and offering wide inclining angle adjustment to address the above-mentioned problems.

SUMMARY OF THE INVENTION

The present disclosure provides a display system and a support unit thereof. The support unit may be conveniently adjusted to securely support the display frame unit in a wide inclining configuration suitable for touch-screen/handwriting operations.

To achieve the above objective, one aspect of the instant disclosure is to provide a display system having a display frame unit and a support unit fixedly coupled to the back thereof. The display frame unit has a bottom portion disposable on a working surface, such as a tabletop. The support unit comprises a connecting base unit, an inclining module, and a rebounding module. The connecting base unit is fixedly disposed to the back of the display frame unit. The inclining module includes a leg member disposable on a working surface, an axle shaft disposed through the leg member and rotatable with respect to the connecting base unit, a spool member non-rotatably disposed on the axle shaft, a friction washer assembly on the axle shaft between the connecting base unit and the leg member, and a tension connector having one end fixed to and wound around the spool member. The rebounding module is fixedly disposed on the back of the display frame unit and has an elastic element coupled therein. The elastic element has a bottom end coupled to the upper end of the tension connector.

Another aspect of the instant disclosure is to provide a support unit for a display frame unit that has a bottom portion disposable on a working surface, such as a tabletop. The support unit includes a connecting base unit, an inclining module, and a rebounding module. The connecting base unit is fixedly disposed to the back of a display unit. The inclining module includes a leg member disposable on a working surface, an axle shaft disposed through the leg member and rotatable with respect to the connecting base unit, a spool member non-rotatably disposed on the axle shaft, a friction washer assembly on the axle shaft between the connecting base unit and the leg member, and a tension connector having one end fixed to and wound around the spool member. The rebounding module is fixedly disposed on the back of the display frame unit and has an elastic element coupled therein. The elastic element has a bottom end coupled to the upper end of the tension connector.

Yet another aspect of the instant disclosure is to provide a display system comprising a display frame unit and a support unit. The display frame unit has a bottom portion for disposing on a working surface. The support unit includes a connecting base unit, an inclining module, and a rebounding module. The connecting base unit is fixedly disposed to the back of the display frame unit. The inclining module is pivotally coupled to the connecting base unit and is configurable to sustain the display frame unit in configurations from being substantially vertical to the working surface to an inclining angle of at least 60 degrees. The rebounding module is fixedly disposed on the back of the display frame unit, and has an elastic element (35) coupled to the inclining module to provide the inclining module sufficient holding force, thereby securely keeping the display frame unit steady in a steep inclining configuration suitable for touch-screen operations.

For further understanding of the present disclosure, reference is made to the following detailed description illustrating the embodiments and examples of the present disclosure. The description is for illustrative purpose only and is not intended to limit the scope of the claim.

DETAILED DESCRIPTION OF THE PREFERRED EMBODIMENTS

To better understand the objective, structure, characteristics, and effects of the present disclosure, a description relating thereto will be made with reference to preferred embodiments thereof and the accompanying drawings.

Figure 1:
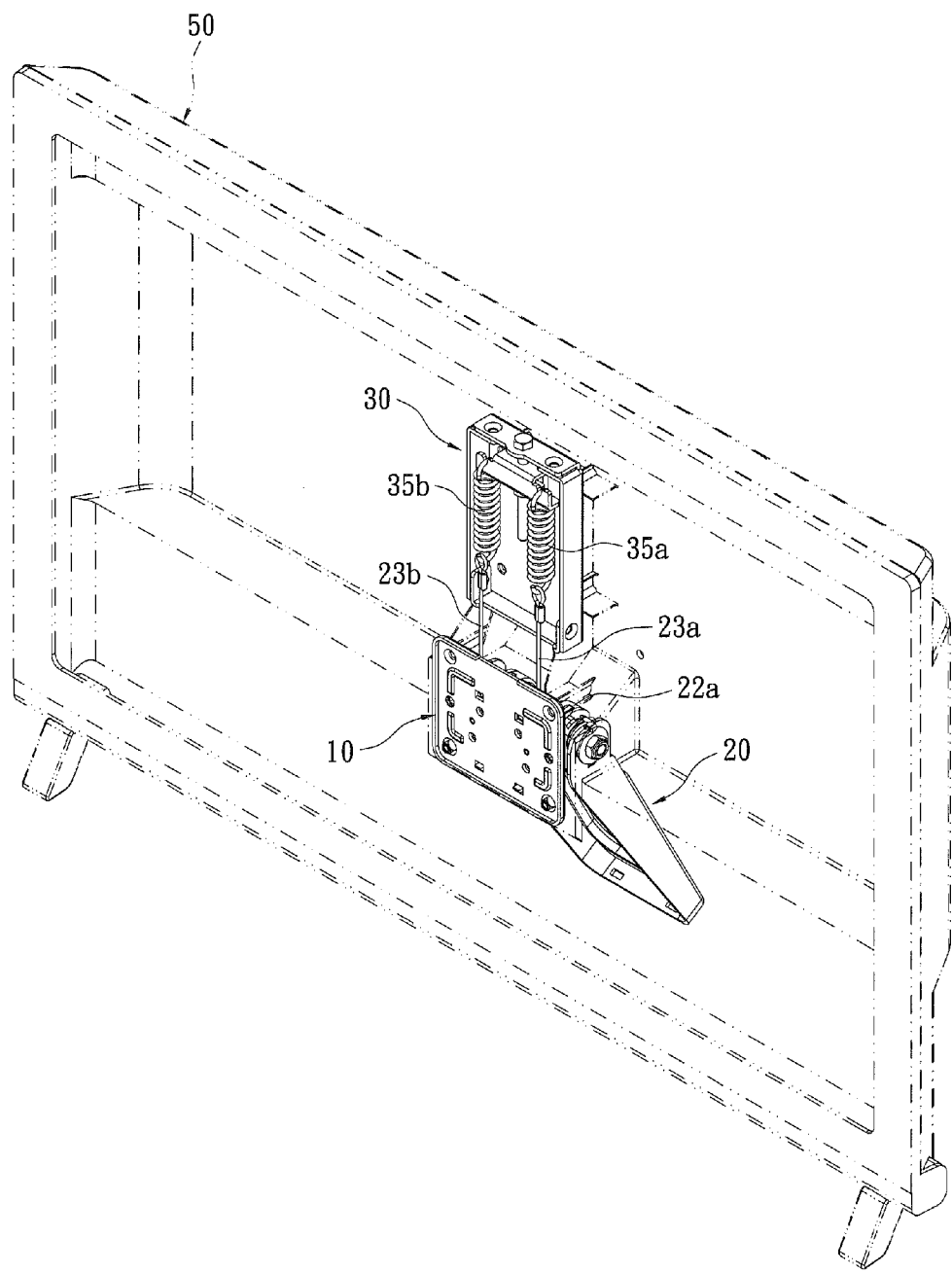
FIG. 1 is a perspective see-through diagram of a photo-frame-type display according to the present disclosure with emphasis on the support unit.
Figure 5:
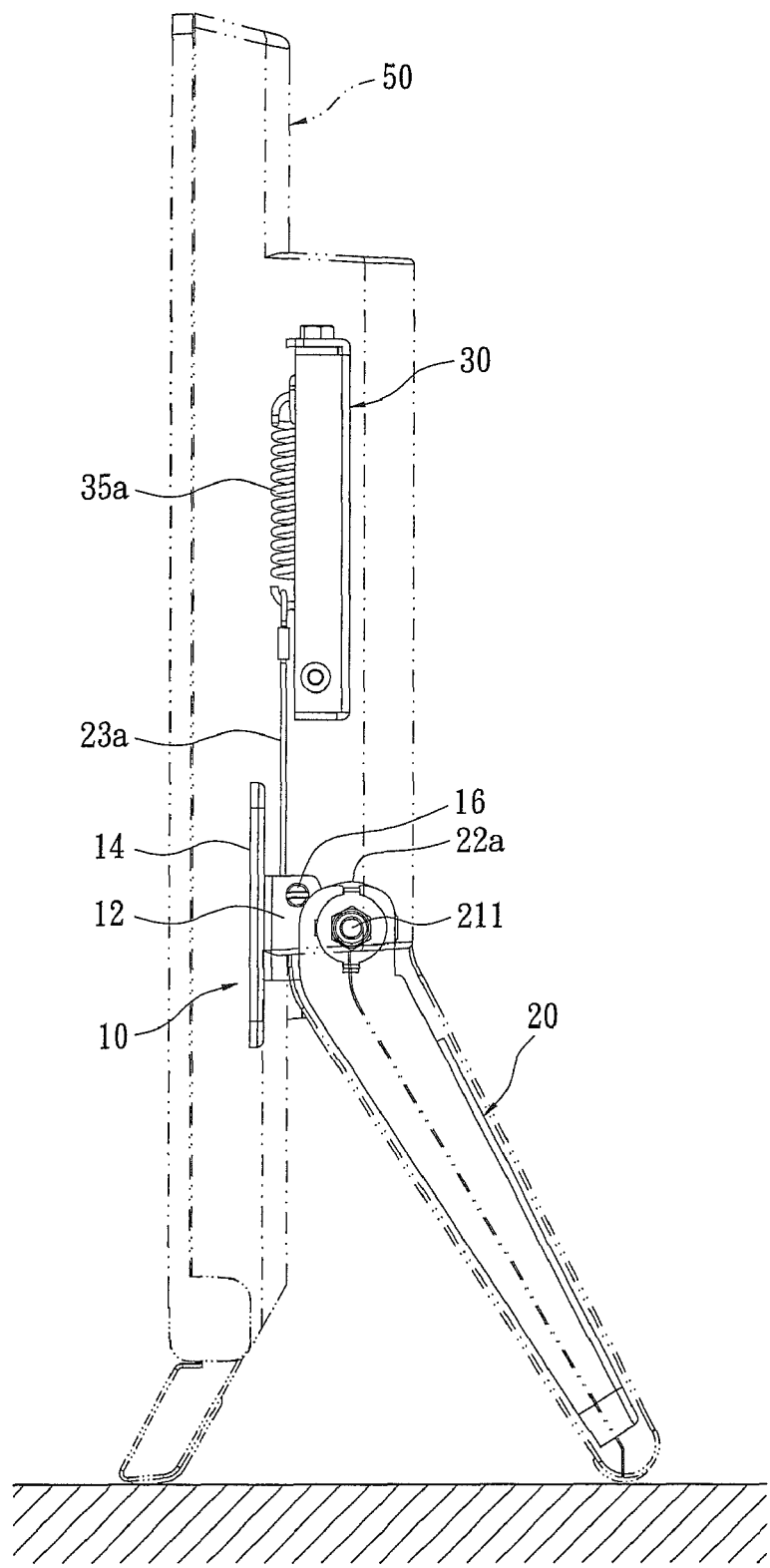
FIG. 5 is a side view of the support unit and a display frame unit in a closed position according to the present disclosure.

FIG. 1 shows a perspective view of a photo-frame-type display and a support unit according to the instant disclosure. The instant photo-frame-type display has a display frame unit 50 and a support unit mounted on the back of the frame unit 50. The bottom portion of the display frame unit 50 may further include a frame support member, and the entire frame unit is disposable on a working surface (such as a tabletop) in a fashion resembling a traditional photo frame (as shown in FIG. 5). The support unit includes a connecting base unit 10, an inclining module 20, and a rebounding module 30. The connecting base unit 10 is fixedly disposed on the back of the display frame unit 50. The inclining module 20 is pivotally coupled to the connecting base unit 10, and is configurable to form a wide inclining angle with respect to the display frame unit 50. The rebounding module 30 is disposed on the back of the display frame unit 50 and in elastic connection with the inclining module 20, thus providing a restoring force that draws the inclining module 20 toward the display frame unit 50.

Figure 2:
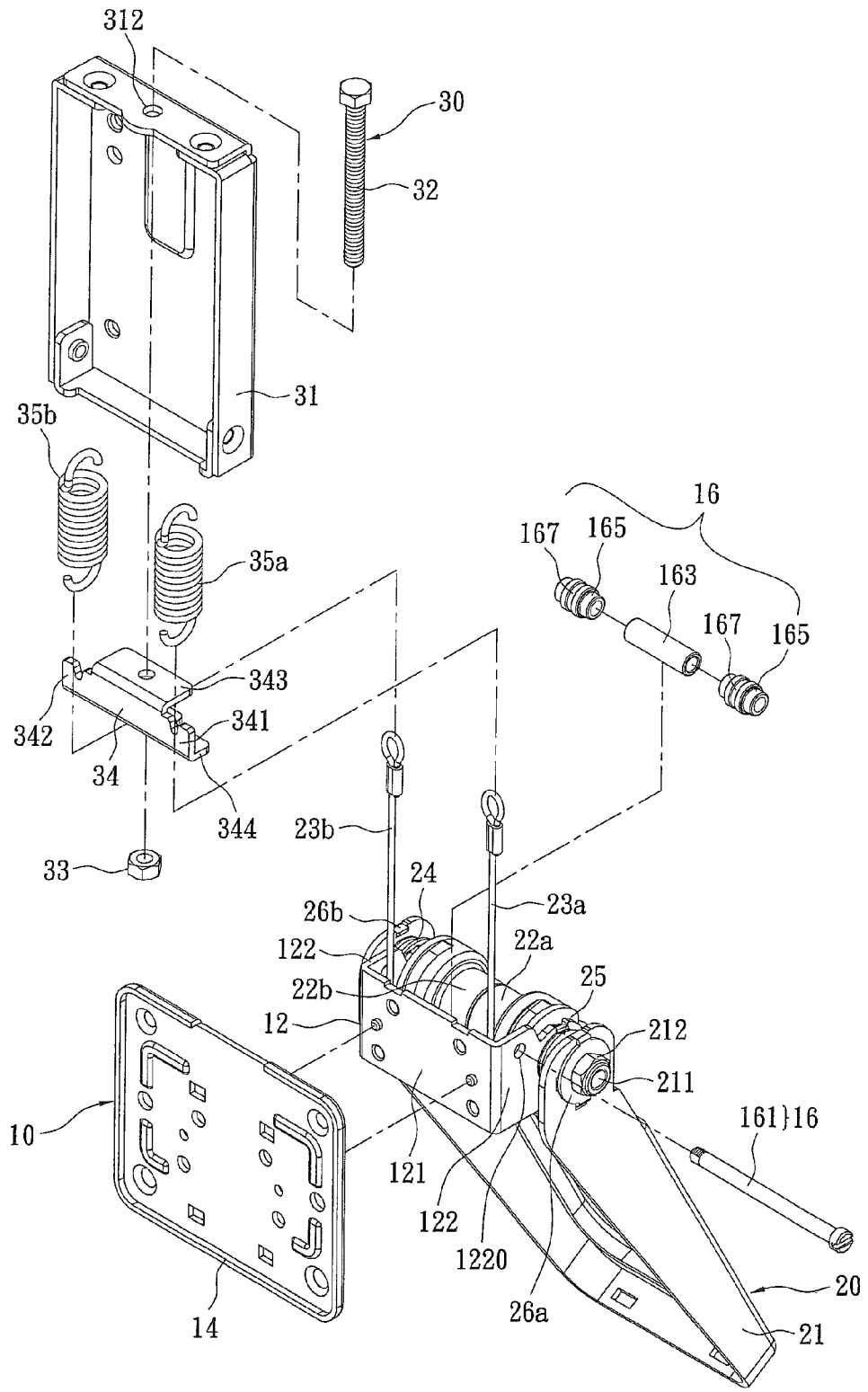
FIG. 2 is a exploded perspective view of the support unit for the photo-frame-type display according to the present disclosure.
Figure 3:
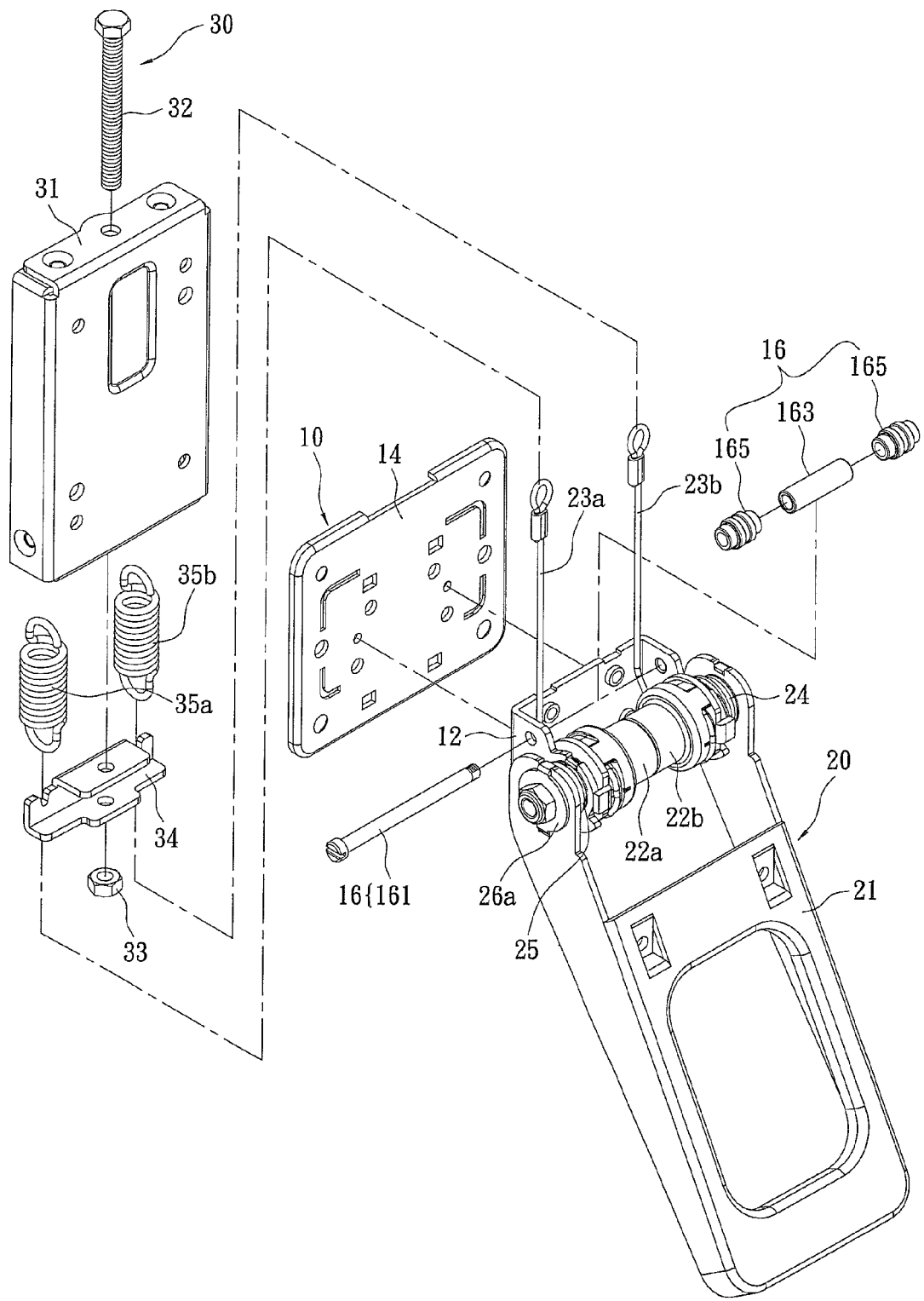
FIG. 3 is another exploded view of the support for photo-frame-type display according to the present disclosure from a different angle.

FIG. 2 and FIG. 3 show the exploded perspective views of one embodiment according to the present disclosure from two different angles. The connecting base unit 10 includes a linking plate 14 fixedly disposed on the back of the display frame unit 50 and a fixing frame 12. The instant embodiment shows a linking plate 14 and a fixing frame 12 as separate units, but the two units can be manufactured as an integral part to serve the same function. The fixing frame 12 has a base portion 121 and a pair of side wall portions 122 extending from the two flanks of the base portion 121. The side wall portion 122 of the fixing frame 12 may further comprise a positioning block 1222, which can be better seen in FIG. 4, to stop the inclining module 20 at a predetermined position, such as the fully closed position.

The inclining module 20 includes a leg member 21, an axle shaft 211 rotatably disposed through an axle mount in the side wall portion 122 of the fixing frame 12, a pair of spool members 22a, 22b disposed on the axle shaft, a pair of tension connectors 23a, 23b having one end fixed to and wound around the spool member 22, and a frictional washer-assembly 24 disposed between the leg member 21 and the fixing frame 12. Specifically, the spool member 22 is non-rotatably disposed on the axle shaft 211 and is rotatable with respect to the fixing frame 12. The tension connector 23 may be a non-rigid coupler capable of withstanding linear load, such as a steel wire.

In the instant embodiment, the connecting base unit 10 may further include a guiding unit 16 for guiding the tension connectors 23a, 23b in a substantially vertical direction. Particularly, the guiding unit 16 includes a pin 161 pivotally disposed through a pivoting slot 1220 of the side wall portion 122 and a pair of rotatable guiding wheels 165. Each guiding wheel 165 has a groove 167 thereon for guiding the tension connector 23. A spacer 163 may be further disposed between the guiding wheels 165 to maintain constant distance between the wheels. Thus, the guiding unit 16 may ensure better alignment of the tension connector 23 while coupled to the rebounding module 30.

Figure 4:
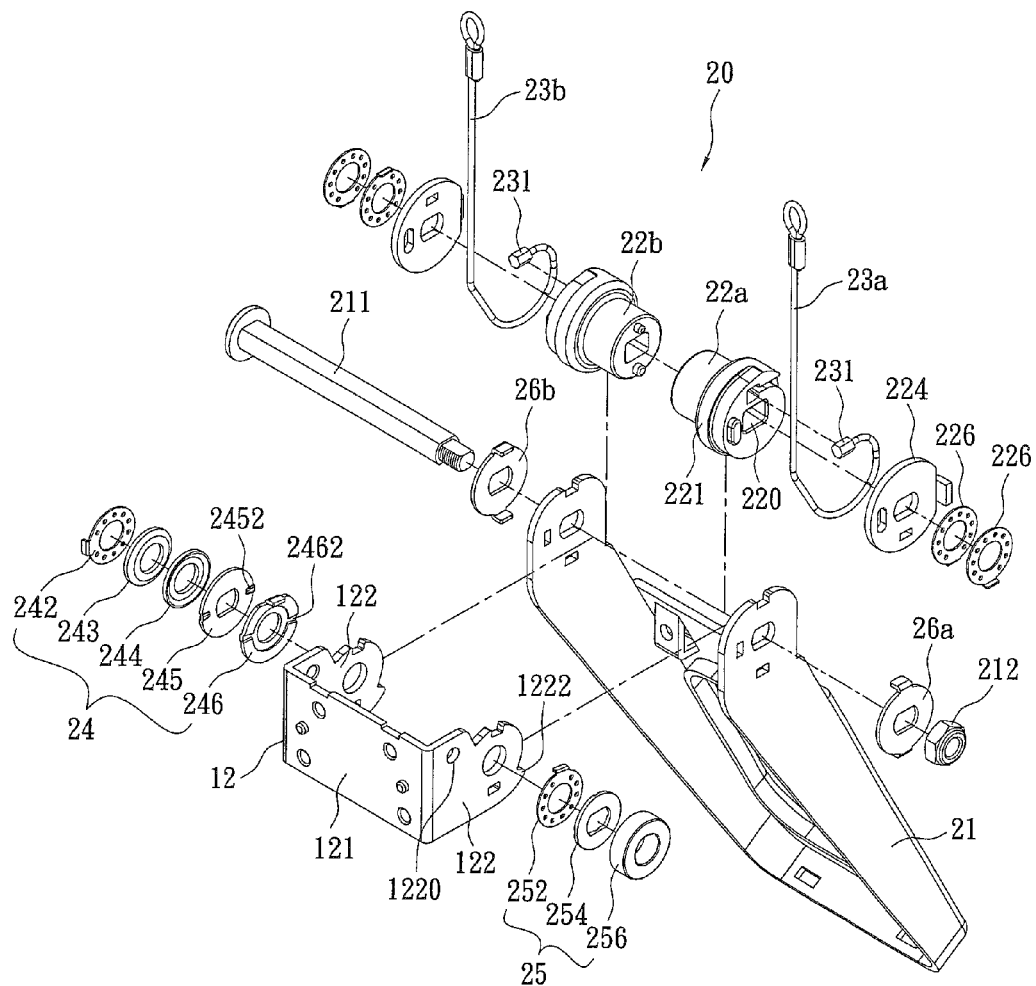
FIG. 4 is a exploded view emphasizing on the supporting leg module of the support unit according to the present disclosure.

Referring to FIG. 4, the leg member 21 of the instant embodiment is substantially U-shaped. The leg member 21 has a top end pivotally connected to the connecting base unit 10 and a bottom end disposable on a working surface, such as the top surface of a desk. Please note that axle shaft 211 is not an exact cylindrical rod but has a pair of parallel surfaces. The bottom end of the axle shaft 211 is fastened with a nut 212 to provide friction adjustment to the washer assembly 24. Each end of the axle shaft 211 further comprises a retaining washer 26a, 26b disposed on an outer side of the leg member 21.

As shown in FIG. 4, the spool member 22 of the present embodiment further comprises a first portion 22a and a second portion 22b. Also particular to the instant embodiment, the tension connector 23 comprises a first connector 23a and a second connector 23b. However, a person skilled in the art should realize that the spool member could also be manufactured as a single unit, or as an integral part of the leg member 21; the number of tension connector is also not limited to two. Each tension connector has one end fixed to and wound around the periphery of the spool member 22. Each spool member 22a/b has an axial-hole 220 for passing the axle shaft 211 there through, a guiding groove 221 on the periphery thereof for guiding the tension connector 23a/b, and a fixing slot 222 formed therein for retaining one end of the tension connector 23a/b.

Still in the present embodiment, the inclining module 20 further comprises a retaining lid 224 disposed on the outer side of the spool member 22a/b and a pair of friction washers 226 at the outer side of the retaining lid 224. The retaining lid 224 covers the retained tension connector 23a/b in the spool member 22a/b to ensure secure coupling of the tension connector 23 to the spool member 22.

A frictional washer-assembly 24 is disposed between the leg member 21 and the fixing frame 12 of the connecting base unit 10. The frictional washer-assembly 24 includes a friction washer 242, a pair of resilient spacers 243, 244, and a pair of retainer washers 245, 246 disposed on the axle shaft 211 in a sequential order shown in FIG. 4. The friction washer 242 is used to provide frictional force between the leg member 21 and the connecting base unit 10. The pair of resilient spacers 243, 244 in the frictional waster assembly enhanced the friction adjustability upon fastening/loosening the nut 212 on the axle shaft 211. Moreover, each retainer washer 245/246 may further comprise a protruding dimple member 2452/2462 at a predefined location. The dimple member 2452/2462 may serve as a position indicator to provide users a clicking feedback when the leg member 21 is turned to a predetermined position, such as a fully closed position.

The inclining module 20 may further comprises a durable washer-assembly 25 disposed between the leg member 21 and the fixing frame 12 on the axle shaft 211. Particularly, the durable washer-assembly 25 is disposed on the other side wall of the fixing frame 12 opposite to the frictional washer-assembly 24. The durable washer-assembly 25 may include a friction washer 252 fixedly disposed to the side wall 122 of the fixing frame 12, a first durable washer 254 non-rotatably disposed on the axle shaft 211, and a second durable washer 256 rotatably disposed on the shaft 211. In the instant embodiment, the second durable washer 256 has two smooth contact surfaces. The first durable washer 254 on the other hand has one smooth surface in contact with the second durable washer 256. The other side of the first durable washer 254 is formed with a plurality of slits.

Referring back to FIG. 2 and FIG. 3. The rebounding module 30 comprises a housing unit 31 fixedly coupled to the back of the display frame unit 50, a load-adjusting unit adjustably disposed on the housing unit 31, and an elastic element 35 coupled to the load-adjusting unit. Specifically, the load-adjusting unit comprises a bolt 32 through a slot 312 on the top of the housing unit 31, a holding rack 34 slidably disposed on the bolt 32, and a nut 33 screwed to the bottom end of the bolt 32. The position of the holding rack 34 on the bolt may be adjusted by fastening/loosening the bolt 32 and the nut 33. One end of the elastic element 35 is coupled to the holding rack 34, and the other to the top end of the tension connector 23 of the inclining module 20. Please note that, although the instant embodiment employs a pair of loading springs 35*a/b* on the load-adjusting unit, a person skilled in the art should realize that the number of the number and type of elastic element is not limited to the illustration of the present drawings.

The preload value of the elastic element 35 may be adjusted by adjusting the position of the holding rack 34 on the bolt 32. In the instant embodiment, the holding rack 34 is substantially U-shaped when viewed from the side. The holding rack 34 includes a pair of hooking portions 341/342 for coupling with the elastic element 35 and a pair of guiding boards 343/344 for guiding the rack on the bolt 32 in a substantially vertical direction.

Figure 6:
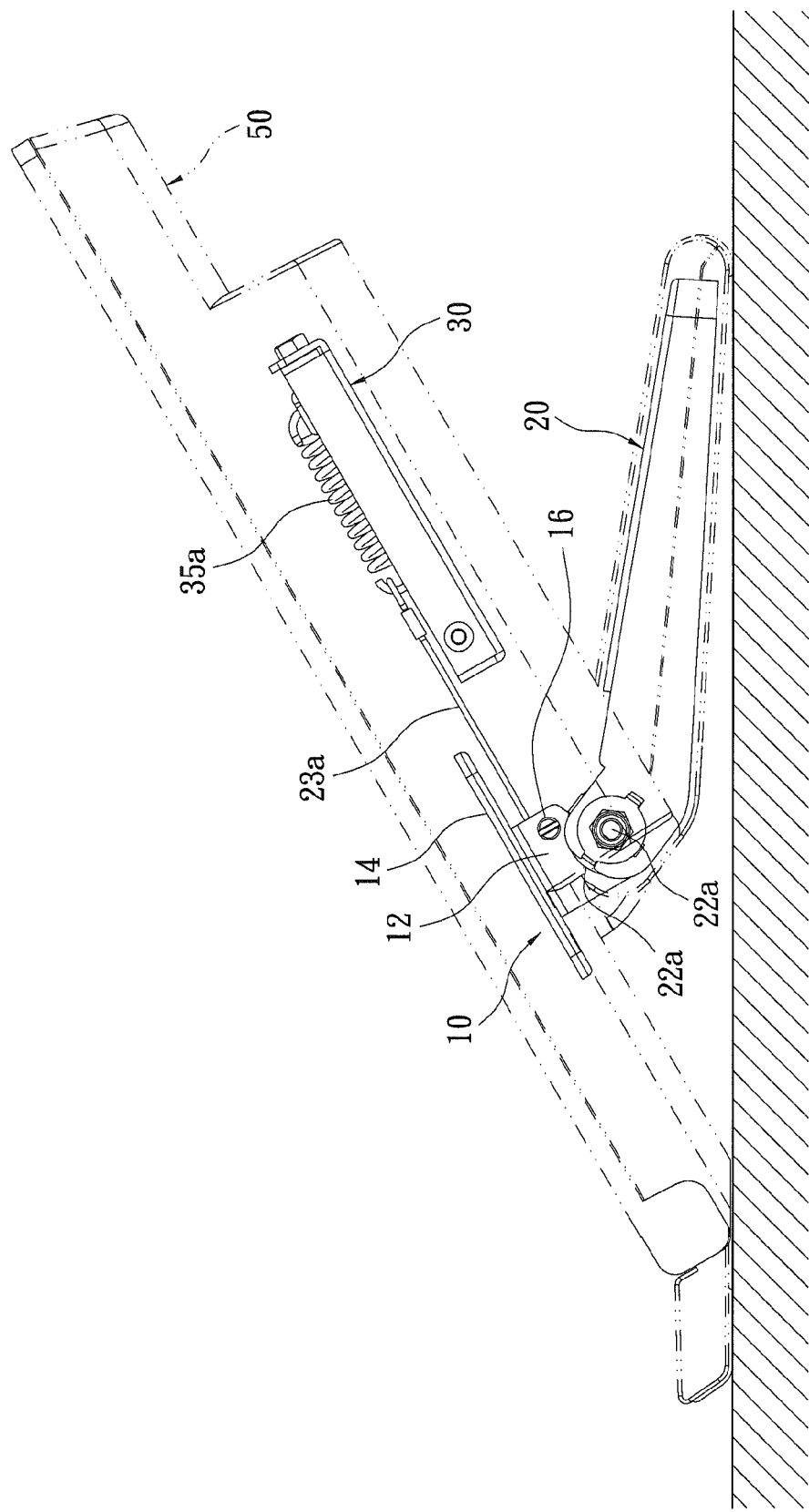
FIG. 6 is a side view of the support unit and the display frame unit in a wide inclining angle according to the present disclosure.

Please refer to FIG. 5 and FIG. 6, which show the side views of the display frame and the support unit in different inclining angles. The display frame unit 50 of the instant disclosure can be disposed on a working surface like a traditional photo frame. For one thing, the display frame unit 50 can be tilted backward at a steep inclining angle. Particularly, the inclining module is configurable to sustain the display frame unit in configurations from being substantially vertical to the working surface to an inclining angle of at least 60 degrees. Moreover, the rebounding module 30 can provide the inclining module 20 a sufficient holding force, thereby securely keeping the display frame unit 50 steady in a steep inclining configuration suitable for touch-screen/handwriting operations.

The description above only illustrates specific embodiments and examples of the present disclosure. The present disclosure should therefore cover various modifications and variations made to the herein-described structure and operations of the present disclosure, provided they fall within the scope of the present invention as defined in the following appended claims.

What is claimed is:

1. A display system comprising:
A. a display frame unit having a bottom portion for disposing on a working surface; and
B. a support unit mounted on the back of the frame unit, the support unit comprising:
i) a connecting base unit fixedly disposed to the back of the display frame unit;
ii) an inclining module pivotally coupled to the connecting base unit, including:
a) leg member having a top end pivotally connected to the connecting base unit and a bottom end for disposing on a working surface,
b) a spool member fixedly coupled to the leg member and rotatable with respect to the connecting base unit;
c) a friction washer assembly disposed between the leg member and the connecting base unit, and
d) a tension connector having one end fixed to and wound around the spool member; and
iii) a rebounding module disposed on the back of the display frame unit, wherein the rebounding module has an elastic element coupled to the other end of the tension connector.

2. The photo-frame-type display of claim 1, wherein the connecting base unit includes a linking plate and a fixing frame,
wherein the linking plate is fixedly disposed on the back of the display frame unit, and
wherein the fixing frame has a base portion fixedly disposed to the linking plate and a side wall portion having an axle slot for receiving an axle shaft.

3. The photo-frame-type display of claim 2, wherein the side wall portion of the fixing frame has at least one positioning block.

4. The photo-frame-type display of claim 2, wherein the fixing frame further comprises a guiding unit for guiding the tension connectors.

5. The photo-frame-type display of claim 1, the inclining module further comprising a retaining lid disposed on the spool member for retaining the tension connector thereon.

6. The photo-frame-type display of claim 1, wherein the friction washer assembly includes a friction washer, a pair of resilient spacers, and a pair of retainer washers, and wherein at least one of the retainer washer further comprise a protruding dimple member at a predefined location.

7. The photo-frame-type display of claim 1, wherein the inclining module further comprising a durable washer assembly disposed on the axle shaft between the leg member and the connecting base unit.

8. The photo-frame-type display of claim 1, wherein the rebounding module comprises a housing unit fixedly disposed to the back of the display frame unit, a load-adjusting unit adjustably disposed on the housing unit, and an elastic element having one end coupled to the load-adjusting unit,
wherein the other end of the elastic element is coupled to the tension connector of the inclining module.

9. The photo-frame-type display of claim 8, wherein the load-adjusting unit comprises a bolt through a slot 312 on the top of the housing unit, a holding rack slidably disposed on the bolt, and a nut screwed to the bottom end of the bolt,
wherein the top end of the elastic element is coupled to the holding rack.

10. A support unit for a display frame having a bottom portion for disposing on a working surface, comprising:
A. a connecting base unit fixedly disposed to the back of the display unit;
B. an inclining module including:
i) a leg member having a top end pivotally connected to the connecting base unit and a bottom end for disposing on a working surface,
ii) a spool member fixedly coupled to the leg member and rotatable with respect to the connecting base unit,
iii) a friction washer assembly disposed between the leg member and the connecting base unit, and
iv) a tension connector having one end fixed to and wound around the spool member; and
C. a rebounding module disposed on the back of the display unit, wherein the rebounding module has an elastic element coupled to the other end of the tension connector.

11. The support unit for photo-frame-type display of claim 10, wherein the connecting base unit comprises a linking plate and a fixing frame, wherein the linking plate is fixedly disposed on the back of the display frame unit, and wherein the fixing frame has a base portion fixedly disposed to the linking plate and a side wall portion having an axle slot for receiving an axle shaft.

12. The support unit for photo-frame-type display of claim 11, wherein the side wall portion of the fixing frame has at least one positioning block.

13. The support unit for photo-frame-type display of claim 11, wherein the fixing frame further comprises a guiding unit for guiding the tension connectors.

14. The support unit for photo-frame-type display of claim 10, wherein the inclining module further comprises a retaining lid disposed on the spool member for retaining the tension connector thereon.

15. The support unit for photo-frame-type display of claim 10, wherein the friction washer assembly includes a friction washer, a pair of resilient spacers, and a pair of retainer washers, and wherein at least one of the retainer washer further comprise a protruding dimple member at a predefined location.

16. The support unit for photo-frame-type display of claim 10, wherein the inclining module further comprising a durable washer assembly disposed on the axle shaft between the leg member and the connecting base unit.

17. The support unit for photo-frame-type display of claim 10, wherein the rebounding module comprises a housing unit fixedly disposed to the back of the display frame unit, a load-adjusting unit adjustably disposed on the housing unit, and an elastic element having one end coupled to the load-adjusting unit, wherein the other end of the elastic element is coupled to the tension connector of the inclining module.

18. The support unit for photo-frame-type display of claim 17, wherein the load-adjusting unit comprises a bolt through a slot on the top of the housing unit, a holding rack slidably disposed on the bolt, and a nut screwed to the bottom end of the bolt, wherein the top end of the elastic element is coupled to the holding rack.

19. A display system comprising:
A. a display frame unit having a bottom portion for disposing on a working surface; and
B. a support unit mounted on the back of the frame unit, the support unit comprising:
  i) a connecting base unit fixedly disposed to the back of the display frame unit;
  ii) an inclining module pivotally coupled to the connecting base unit, wherein the inclining module is configurable to sustain the display frame unit in configurations from being substantially vertical to the working surface to an inclining angle of about at least 60 degrees;
  iii) a rebounding module disposed on the back of the display frame unit, wherein the rebounding module has an elastic element coupled to the inclining module, wherein the rebounding module provides the inclining module sufficient holding force, thereby securely keeping the display frame unit steady in a steep inclining configuration suitable for touch-screen operations.

* * * * *